(12) United States Patent
Li

(10) Patent No.: US 12,271,838 B2
(45) Date of Patent: *Apr. 8, 2025

(54) SYSTEMS AND METHODS FOR REPORT GENERATION

(71) Applicant: HITHINK ROYALFLUSH INFORMATION NETWORK CO., LTD., Zhejiang (CN)

(72) Inventor: Chengjun Li, Hangzhou (CN)

(73) Assignee: HITHINK ROYALFLUSH INFORMATION NETWORK CO., LTD., Hangzhou (CN)

( * ) Notice: Subject to any disclaimer, the term of this patent is extended or adjusted under 35 U.S.C. 154(b) by 58 days.

This patent is subject to a terminal disclaimer.

(21) Appl. No.: 18/167,082

(22) Filed: Feb. 10, 2023

(65) Prior Publication Data

US 2023/0196219 A1 Jun. 22, 2023

Related U.S. Application Data

(63) Continuation of application No. 16/681,943, filed on Nov. 13, 2019, now Pat. No. 11,580,463.

(30) Foreign Application Priority Data

May 6, 2019 (CN) .......................... 201910370345.9

(51) Int. Cl.
*G06F 16/901* (2019.01)
*G06F 16/33* (2019.01)
(Continued)

(52) U.S. Cl.
CPC ......... *G06Q 10/063* (2013.01); *G06F 16/334* (2019.01); *G06F 16/345* (2019.01);
(Continued)

(58) Field of Classification Search
CPC ...... G06F 16/33; G06F 16/345; G06F 16/334; G06F 16/34; G06F 16/951;
(Continued)

(56) References Cited

U.S. PATENT DOCUMENTS

| | | | |
|---|---|---|---|
| 8,484,218 B2 * | 7/2013 | Raghunath | G06F 40/44 |
| | | | 707/769 |
| 8,725,594 B1 | 5/2014 | Davies et al. | |

(Continued)

FOREIGN PATENT DOCUMENTS

| | | |
|---|---|---|
| CN | 106126674 A | 11/2010 |
| CN | 102270330 A | 12/2011 |

(Continued)

OTHER PUBLICATIONS

First Office Action in Chinese Application No. 201910370345.9 mailed on Oct. 21, 2020, 17 pages.

(Continued)

*Primary Examiner* — Kuen S Lu
(74) *Attorney, Agent, or Firm* — METIS IP LLC

(57) ABSTRACT

A system and a method for industry field analysis is provided. The system may acquire a key word related to an industry field. The system may also determine a plurality of components in an industry chain of the industry field by retrieving and analyzing information related to the key word related to the industry field. The system may further generate an industry chain graph related to the industry field based on the plurality of components.

20 Claims, 7 Drawing Sheets

(51) Int. Cl.
  *G06F 16/334* (2025.01)
  *G06F 16/34* (2019.01)
  *G06F 16/951* (2019.01)
  *G06Q 10/063* (2023.01)
  *G06Q 10/10* (2023.01)
  *G06Q 30/0201* (2023.01)

(52) U.S. Cl.
  CPC ........ *G06F 16/9024* (2019.01); *G06F 16/951* (2019.01); *G06Q 10/10* (2013.01); *G06Q 30/0201* (2013.01)

(58) Field of Classification Search
  CPC .......... G06F 16/9024; G06Q 30/0201; G06Q 10/10; G06Q 10/063
  USPC ........................................................ 707/603
  See application file for complete search history.

(56) References Cited

U.S. PATENT DOCUMENTS

| | | | | |
|---|---|---|---|---|
| 8,799,297 | B2 * | 8/2014 | Holsman | G06F 16/95 706/14 |
| 9,424,333 | B1 * | 8/2016 | Bisignani | G06F 3/0482 |
| 9,721,295 | B1 * | 8/2017 | Miller | G06Q 40/02 |
| 9,992,219 | B1 | 6/2018 | Hamlet et al. | |
| 2008/0140160 | A1 * | 6/2008 | Goetz | G16H 40/67 607/60 |
| 2008/0181398 | A1 | 7/2008 | Pappu | |
| 2008/0208906 | A1 * | 8/2008 | Penner | G06F 40/186 |
| 2011/0029853 | A1 * | 2/2011 | Garrity | G06F 16/283 709/217 |
| 2012/0084092 | A1 * | 4/2012 | Kozuch | G16H 10/20 705/2 |
| 2012/0154283 | A1 * | 6/2012 | Jacobsen | G06F 8/10 715/764 |
| 2012/0303492 | A1 | 11/2012 | Connors et al. | |
| 2013/0211870 | A1 | 8/2013 | Lawson et al. | |
| 2014/0058775 | A1 | 2/2014 | Siig et al. | |
| 2014/0114964 | A1 | 4/2014 | Dong et al. | |
| 2014/0222521 | A1 | 8/2014 | Chait | |
| 2014/0222522 | A1 | 8/2014 | Chait | |
| 2014/0278706 | A1 | 9/2014 | Leidner et al. | |
| 2016/0154856 | A1 | 6/2016 | Olof-Ors et al. | |
| 2016/0371618 | A1 | 12/2016 | Leidner et al. | |
| 2017/0039500 | A1 | 2/2017 | Leidner et al. | |
| 2017/0255790 | A1 * | 9/2017 | Barrett | G06F 21/6245 |
| 2018/0082183 | A1 | 3/2018 | Hertz et al. | |
| 2018/0197128 | A1 | 7/2018 | Carstens et al. | |
| 2018/0275951 | A1 | 9/2018 | Kagoshima | |
| 2018/0285996 | A1 * | 10/2018 | Ma | H04L 9/3297 |
| 2018/0365610 | A1 | 12/2018 | Klett et al. | |
| 2019/0114567 | A1 | 4/2019 | Kamath et al. | |
| 2019/0303831 | A1 | 10/2019 | Martin et al. | |
| 2020/0226536 | A1 | 7/2020 | Uttam et al. | |

FOREIGN PATENT DOCUMENTS

| | | |
|---|---|---|
| CN | 105930946 A | 9/2016 |
| CN | 106448675 A | 2/2017 |
| CN | 107066499 A | 8/2017 |
| CN | 107305541 A | 10/2017 |
| CN | 107342976 A | 11/2017 |
| CN | 108536654 A | 9/2018 |
| JP | 5685702 B2 | 3/2015 |

OTHER PUBLICATIONS

The Second Office Action in Chinese Application No. 201910370345.9 mailed on Mar. 10, 2021, 12 pages.

Theodor Ciuta et al., The Raw Materials Supply Chain Viewer, Technical Report by the Joint Research Centre (JRC), 2019, 34 pages.

Hyojae Joun et al., Analyzing Relationships the Among Web Link Structure, Webpage Keyword, and Popular Rank : Travel Industry, Journal of Information Technology Applications and Management, 13(4): 167-180, 2006.

* cited by examiner

SYSTEMS AND METHODS FOR REPORT GENERATION

CROSS-REFERENCE TO RELATED APPLICATIONS

This application is a Continuation of U.S. application Ser. No. 16/681,943, field on Nov. 13, 2019, which claims priority to Chinese Patent Application No. 201910370345.9, filed on May 6, 2019, the content of which is hereby incorporated by reference.

TECHNICAL FIELD

The present disclosure generally relates to systems and methods for generating a report, and in particular, to systems and methods for generating the report automatically.

BACKGROUND

Databases may have a complex structure, which is not ease-of-use by users. Users, especially business users, expect to receive a report in their vocabulary, not the vocabulary of the database via searching the database. While some tools in the marketplace allow a user to define a new and map the new term to one or more existing terms in the database, the tools may be unable to automatically manage and update related new terms. Therefore, it would be desirable to provide systems and methods for generating reports based on a database.

SUMMARY

According to one aspect of the present disclosure, a system for generating a report may include at least one non-transitory storage medium including a set of instructions, and at least one processor in communication with the at least one non-transitory storage medium. When executing the set of instructions, the at least one processor may be configured to direct the system to acquire a key word related to an industry field, and acquire one or more condition values related to the report to be generated. The at least one processor may be further configured to direct the system to determine a report template having one or more data query sections and one or more conclusion sections based on the industry field and the one or more condition values, and acquire report data based on the one or more data query sections of the report template. The at least one processor may be also configured to direct the system to determine one or more conclusions based on the report data, and generate the report based on the acquired report data, the one or more conclusions, and the report template.

In some embodiments, the at least one processor may be further configured to direct the system to highlight a portion of the content in the report based on the one or more conclusions.

In some embodiments, at least one of the one or more conclusions may be determined based on a trend of a business indicator over a period of time.

In some embodiments, at least one of the one or more conclusions may be determined based on a comparison between a plurality of business indicators across a same time period.

In some embodiments, at least one of the one or more condition values may be related to a time range or a type of the report to be generated.

In some embodiments, at least one of the one or more conclusions may include an alert. To generate the at least one conclusion, the at least one processor may be further configured to direct the system to determine whether a condition regarding the alert is satisfied based on the report data, and generate the at least one conclusion that includes the alert in response to a determination that the condition regarding the alert is satisfied.

In some embodiments, at least one of the one or more conclusion may be generated based on a trained model.

In some embodiments, the report may be editable. The at least one processor may be further configured to direct the system to receive an instruction to edit the report from a user, and update the report in response to the instruction.

According to another aspect of the present disclosure, a method for generating a report may be implemented on a computing device having at least one processor and at least one storage device. The method may include acquiring a key word related to an industry field, and acquiring one or more condition values related to the report to be generated. The method may also include determining a report template having one or more data query sections and one or more conclusion sections based on the industry field and the one or more condition values, and acquiring report data based on the one or more data query sections of the report template. The method may further include determining one or more conclusions based on the report data, and generating the report based on the acquired report data, the one or more conclusions, and the report template.

According to yet another aspect of the present disclosure, a non-transitory computer readable medium may include a set of instructions for generating a report. When executed by at least one processor, the set of instructions may direct the at least one processor to effectuate a method. The method may include acquiring a key word related to an industry field, and acquiring one or more condition values related to the report to be generated. The method may also include determining a report template having one or more data query sections and one or more conclusion sections based on the industry field and the one or more condition values, and acquiring report data based on the one or more data query sections of the report template. The method may further include determining one or more conclusions based on the report data, and generating the report based on the acquired report data, the one or more conclusions, and the report template.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Figure 2:
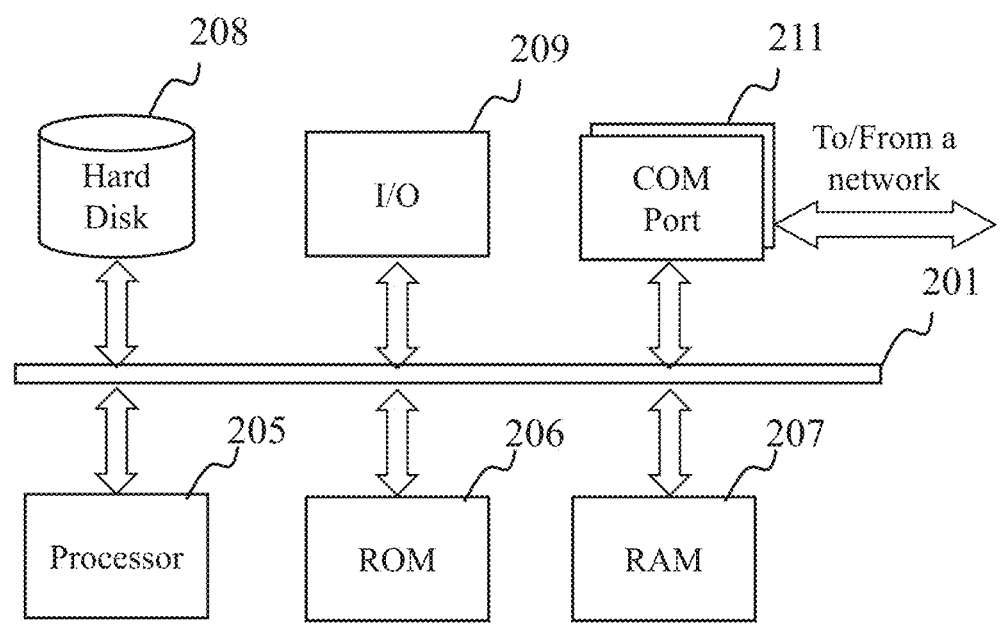
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 205 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "user" in the present disclosure may refer to any individual (e.g., an investment analyst, an investor, a financial planner, a financial analyst) or entity (e.g., a financial organization) needs to generate a report regarding a certain industry field.

An aspect of the present disclosure relates to systems and methods for generating a report automatically. The report may be generated based on a logical relationship between data and investment conclusions. The data may include data of an industry, data of the upstream and the downstream of the industry, data of a company of each component in the upriver and downstream of the industry. The investment conclusions may include an expansionary path, an actual price, earnings rate of a company in an industry, or the like, or any combination thereof. The investment conclusions may be determined based on historical data. The historical data may include data of an industry, data of upriver and downstream of the industry, data of a company of each component in the upstream and downstream in a previous time point (3 P.M. in last Monday) or a previous period of time (a day, a week, a mouth, a quarter, a year, etc.)

Figure 1:
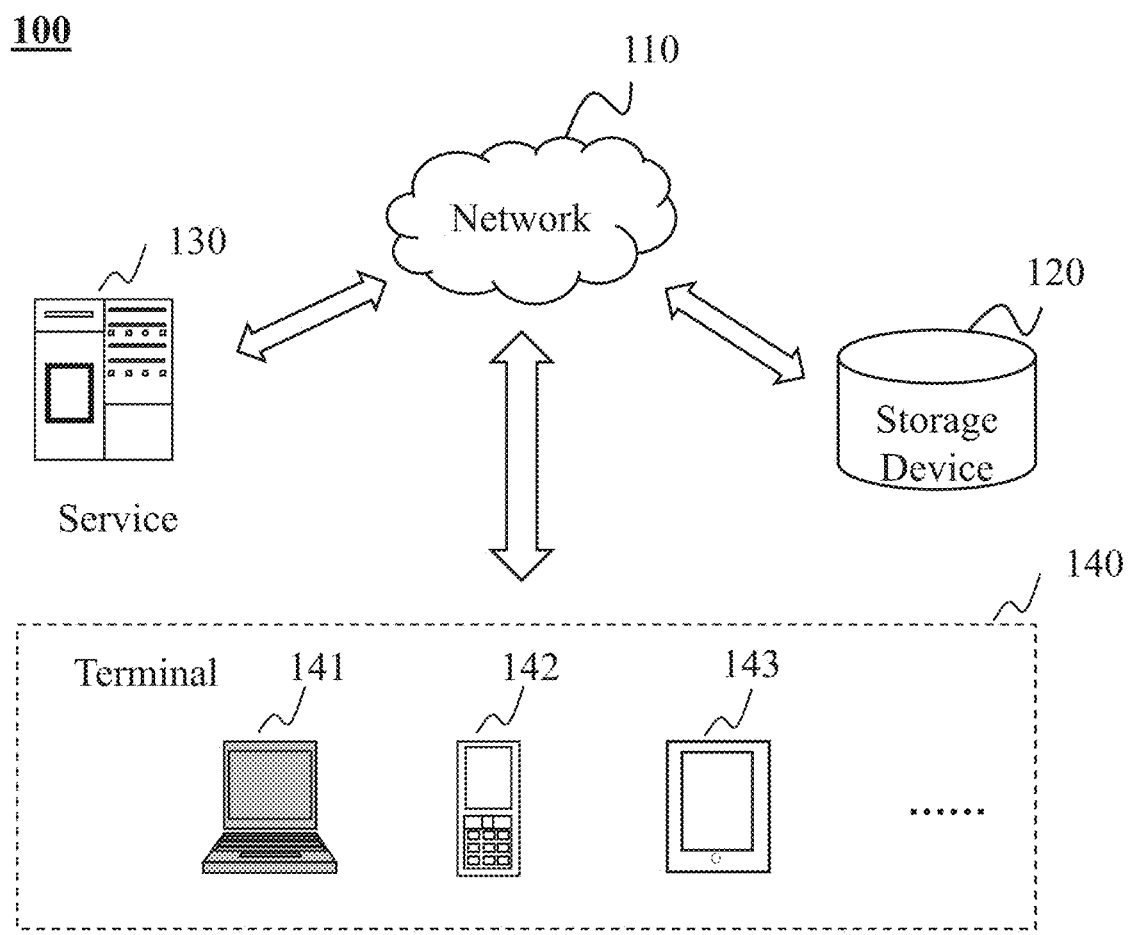
FIG. 1 is a schematic diagram illustrating an exemplary report generation system according to some embodiments of the present disclosure.

FIG. 1 is a schematic diagram illustrating an exemplary report generation system 100 according to some embodiments of the present disclosure. The report generation system 100 may include a network 110, a storage device 120, a server 130, and a terminal 140.

In some embodiments, the network 110 may facilitate the exchange of information and/or data in the report generation system. In some embodiments, one or more components of the report generation system 100 (e.g., the storage device 120, the server 130, and/or the terminal 140) may transmit information and/or data to another component (s) of the report generation system 100 via the network 110. For example, the server 130 may receive data from the storage device 120 via the network 110. As another example, the server 130 may send a report to the terminal 140 via the network 110.

In some embodiments, the network 110 may be any type of wired or wireless network, or combination thereof. Merely by way of example, the network 110 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or a combination thereof. In some embodiments, the network 110 may include one or more network access points. For example, the network 110 may include wired or wireless network access points such as base stations and/or internet exchange points, through which one or more components of the report generation system 100 may be connected to the network 110 to exchange data and/or information.

The storage device 120 may store data and/or instructions. In some embodiments, the storage device 120 may store data obtained from the network 110, terminal 140, and/or the server 130. For example, the storage device 120 may store data acquired from the network 110. In some embodiments, the storage device 120 may store data and/or instructions that the server 130 may execute or use to perform exemplary methods described in the present disclosure. In some embodiments, the storage device 120 may include a mass storage device, removable storage device, a volatile read-and-write memory, a read-only memory (ROM), or the like, or a combination thereof. Exemplary mass storage devices may include a magnetic disk, an optical disk, solid-state drives, etc. Exemplary removable storage devices may include a flash drive, a floppy disk, an optical disk, a memory card, a zip disk, a magnetic tape, etc. Exemplary volatile read-and-write memory may include random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 120 may be implemented on a cloud platform. Merely by way of example, the cloud platform may include a private cloud, a public cloud, a hybrid cloud, a community cloud, a distributed cloud, an inter-cloud, a multi-cloud, or the like, or a combination thereof.

In some embodiments, the storage device 120 may be connected to the network 110 to communicate with one or more components of the report generation system 100 (e.g., the server 130 or the terminal 140). One or more components of the report generation system 100 may access the data or instructions stored in the storage device 120 via the network 110. In some embodiments, the storage device 120 may be directly connected to or communicate with one or more components of the report generation system 100 (e.g., the server 130 and/or the terminal 140). In some embodiments, the storage device 120 may be part of the server 130.

In some embodiments, one or more components of the report generation system 100 (e.g., the server 130, the terminal 140) may have permissions to access the storage device 120. In some embodiments, one or more components of the report generation system 100 may read and/or modify information when one or more conditions are met.

In some embodiments, the server 130 may be a single server or a server group. The server group may be centralized, or distributed (e.g., the server 130 may be a distributed system). In some embodiments, the server 130 may be local or remote. For example, the server 130 may access information and/or data stored in the terminal 140, the server 130 via the network 110. As another example, the server 130 may be directly connected to the terminal 140 and/or the server 130 to access stored information and/or data. In some embodiments, the server 130 may be implemented on a cloud platform. Merely by way of example, the cloud platform may include a private cloud, a public cloud, a hybrid cloud, a community cloud, a distributed cloud, an inter-cloud, a multi-cloud, or the like, or a combination thereof. In some embodiments, the server 130 may be implemented on a computing device 200 having one or more components illustrated in FIG. 2.

In some embodiments, the server 130 may include one or more processing devices (e.g., single-core processing device(s) or multi-core processor(s)). Merely by way of example, the server 130 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or a combination thereof.

In some embodiments, the terminal 140 may enable a user interaction between a user and one or more components of the report generation system 100. For example, as shown in FIG. 1, the terminal 140 may include a tablet computer 140-1, a mobile device 140-2, a laptop computer 140-3, or the like, or a combination thereof. In some embodiments, the mobile device 140-2 may include a smart home device, a wearable device, a smart mobile device, an augmented reality device, or the like, or a combination thereof. In some embodiments, the wearable device may include a smart bracelet, a smart footgear, smart glasses, a smart helmet, a smart watch, smart clothing, a smart backpack, a smart accessory, or the like, or a combination thereof. In some embodiments, the smart mobile device may include a smartphone, a personal digital assistant (PDA), a gaming device, a navigation device, a point of sale (POS) device, or the like, or a combination thereof.

FIG. 2 is a schematic diagram illustrating exemplary hardware and/or software components of a computing device according to some embodiments of the present disclosure. The computing device 200 may be used to implement any component of the report generation system 100 as described herein. For example, the server 130 may be implemented on the computing device 200, via its hardware, software program, firmware, or a combination thereof. Although only one such computer is shown, for convenience, the computer functions relating to the drowsiness detection as described herein may be implemented in a distributed fashion on a number of similar platforms to distribute the processing load.

The computing device 200, for example, may include a communication (COM) port 211 connected to and from a network connected thereto to facilitate data communications. The computing device 200 may also include a processor 205, in the form of one or more processors (e.g., logic circuits), for executing program instructions. For example, the processor 205 may include interface circuits and processing circuits therein. The interface circuits may be configured to receive electronic signals from a bus 201, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 201.

The computing device 200 may further include program storage and data storage of different forms including, for example, a hard disk 208, and a read-only memory (ROM) 206, or a random access memory (RAM) 207, for various data files to be processed and/or transmitted by the computing device. The exemplary computer platform may also include program instructions stored in the ROM 206, RAM 207, and/or another type of non-transitory storage medium to be executed by the processor 205. The methods and/or processes of the present disclosure may be implemented as the program instructions. The computing device 200 also includes an I/O component 209, supporting input/output between the computer and other components. The computing device 200 may also receive programming and data via network communications.

Merely for illustration, only one processor is described in FIG. 2. Multiple processors are also contemplated. Thus operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
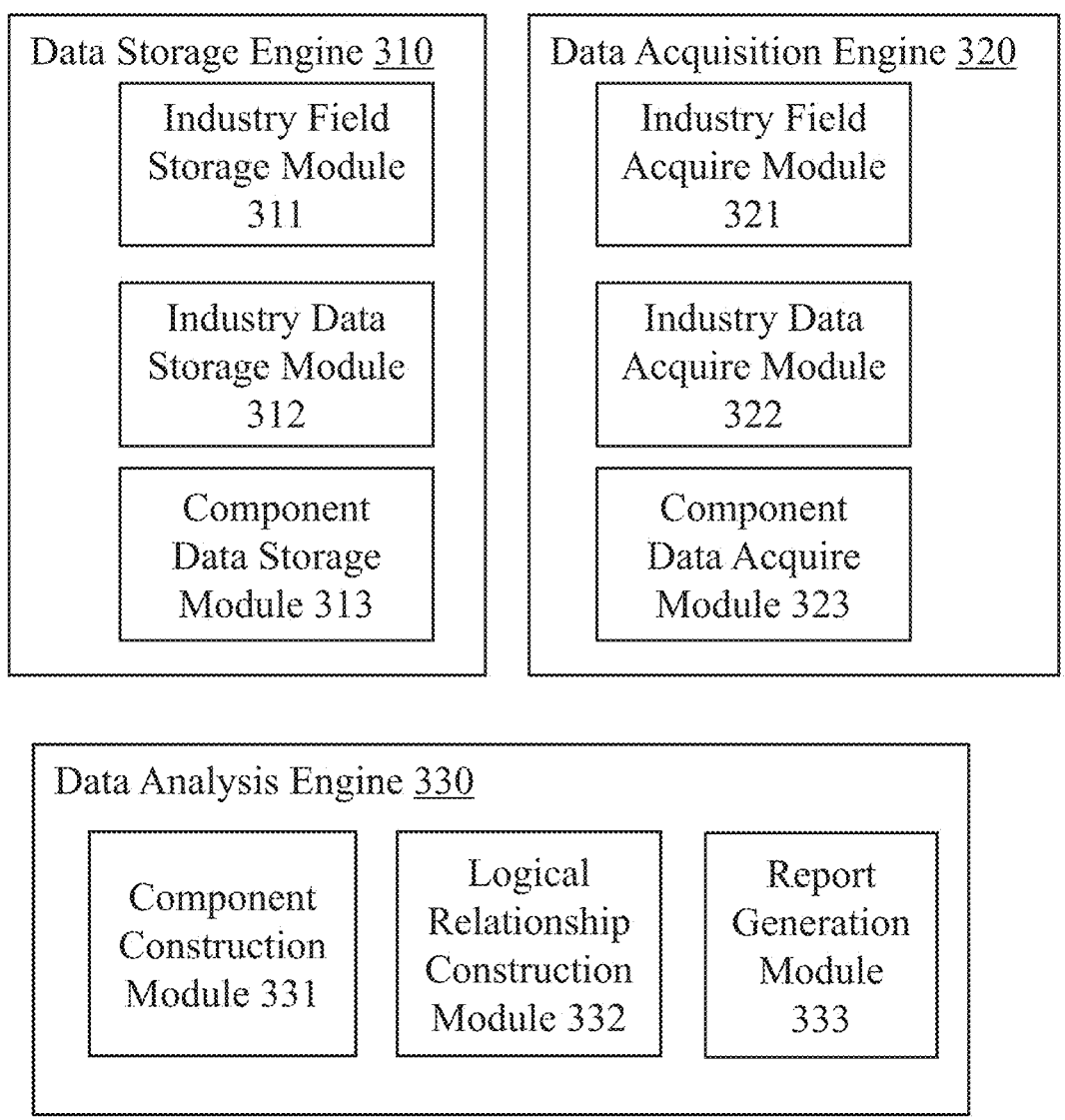
FIG. 3 is a block diagram illustrating an exemplary report generation system according to some embodiments of the present disclosure.

FIG. 3 is a block diagram illustrating an exemplary report generation system 100 according to some embodiments of the present disclosure. The report generation system 100 may include a data storage engine 310, a data acquisition engine 320 and a data analysis engine 330.

In some embodiments, the data storage engine 310 may be configured to store data. In some embodiments, the data storage engine 310 may include an industry field storage module 311, an industry data storage module 312, and a component data storage module 313. The industry field storage module 311 may store a plurality of industry fields (e.g., real estate, food service, cosmetics, apparel, tourism, internet, office supplies industry, electronics, daily necessities, communications equipment, toys, jewelry, etc.). The industry data storage module 312 may store any economic index corresponding to the industry field. The component data storage module 313 may store data relating to a plurality of components in an industry field. The component data may include any index of each component of the industry field. For example, the component data may be an economic benefit of concrete.

The data acquisition engine 320 may be configured to acquire data. In some embodiments, the data acquisition engine 320 may include an industry field acquire module 321, an industry data acquisition module 312, and a component data acquisition module 323. In some embodiments, the data acquisition engine 320 may acquire data from the data storage engine 310 or an external storage device. In some embodiments, the data acquisition engine 320 may acquire data from the storage device 120 and/or the terminal 140 via the network 110.

The data analysis engine 330 may be configured to analyze data. The data analysis engine 330 may include a component construction module 331, a logical relationship construction module 332, and a report generation module 333. The component construction module 331 may be configured to determine one or more components in an industry chain of the industry field. For example, the one or more components in an industry chain of real estate may include building materials, building design, land, real estate financing, real estate operating, decoration, or the like, or any combination thereof.

The logical relationship construction module 332 may be configured to construct a logical relationship between data and an investment conclusion. In some embodiments, the data may include industry data and component data. In some embodiments, the data may be intermediate data acquired based on the industry data and the component data. For example, the intermediate data may be about the liquidity of a company determined based on financial data of the company. Exemplary investment conclusions may include an expansionary path, an actual price, an earnings rate of a company in an industry, or the like, or any combination thereof. In some embodiments, the investment conclusion(s) may be determined based on historical data.

The report generation module 333 may be configured to generate a report. The report may be a weekly report, a monthly report, an annual report, a comment report, an event review report, or the like, or any combination thereof, of a company, a component of an industry chain, or the whole industry. In some embodiments, the report may include a plurality of graphs and/or text descriptions. In some embodiments, the report may be updated when the data based on which the report is generated has changed, e.g., in real time. In some embodiments, the report may be editable. Specifically, the user may edit the report via a user application installed on a terminal (e.g., the terminal 140). In some embodiment, the user may add new content or delete some content in the report. For example, the user may add a graph which is related to the trend of housing sales. In some embodiment, the user may be forbidden from editing certain content in the report via the application installed on the terminal.

In some embodiments, the modules in the report generation system 100 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. In some embodiments, a module of the report generation system 100 may be implemented on one or more components as described in connection with FIGS. 1 and 2. Two or more of the modules may be combined into a single module, and any one of the modules may be divided into two or more units. Additionally or alternatively, the report generation system 100 may include one or more additional components and/or one or more of the components described above may be omitted.

Figure 4:
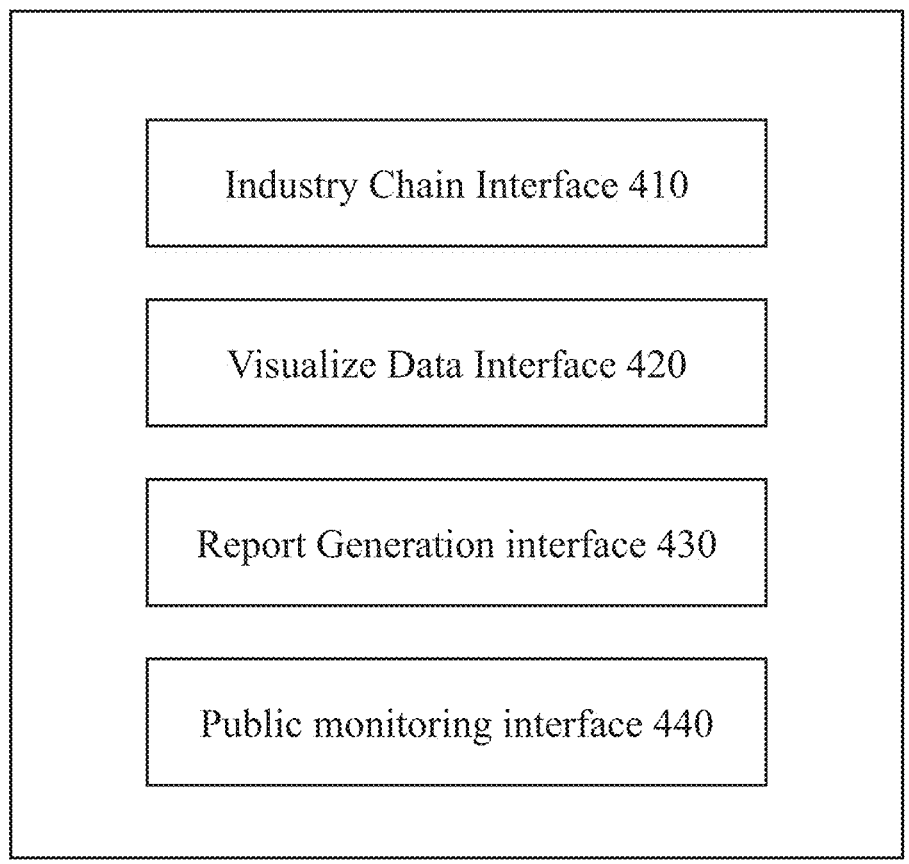
FIG. 4 is a block diagram illustrating an exemplary interface of a terminal according to some embodiments of the present disclosure.

FIG. 4 is a block diagram illustrating an exemplary interface of a user application according to some embodiments of the present disclosure. The user application may be installed in a terminal (e.g., the terminal 140). The interface of the user application may include an industry chain interface 410, a visualized data interface 420, a report generation interface 430, and a public opinion monitoring interface 440. In some embodiments, the user application may be downloaded to the terminal from the server 130. In some embodiments, the user application may be obtained from a storage device (e.g., a CD) that stores the user application.

The industry chain interface 410 may be configured to display the industry chain of an industry field. For example, the industry chain of real estate industry may include building materials, building design, land, real estate financing, real estate operating, decoration, or the like, or any combination thereof.

In some embodiments, the industry chain interface 410 may further display a relationship between components in an industry chain. For example, the upstream in an industry chain of the real estate industry may be building materials and land, and the downstream of the industry chain may be real estate operating and decoration. In some embodiments, the relationship between components in an industry chain may be represented by a plurality of lines. For example, a real estate company and a consumer may loan from a bank, respectively, to buy housing. So, there may be a line between the real estate company and the bank and another line between the bank and the consumer. In some embodiments, the line may be a directional line that indicates a direction (e.g., the money flows from the bank to the real estate company).

The visualized data interface 420 may be configured to display data. The data may include industry data and/or component data. The industry data of an industry field may include any economic index corresponding to the industry field. For example, the industry data of the real estate industry may include a nationwide average sales volume of housing, a nationwide housing inventory or the like, or any combination thereof. Additionally or alternatively, the industry data of the real estate industry may include a price trend, and a prevailing mortgage rate, or the like. The component data of an industry field may include any index of a component in the industry chain of the industry field. For example, the component data of a component may include an economic benefit of the component. In some embodiments, the data may be displayed on a same page as the industry chain on the industry chain interface 410. For example, the component data of a certain component may be displayed nearby the certain component on the industry chain interface 410. In some embodiments, the data may be displayed on an independent page. For example, when the user selects a component in the industry chain, the industry chain interface 410 may enter the visualized data interface 420 to display the component data of the selected component.

In some embodiments, the data may be displayed in a graph, an image, a text, or the like, or any combination thereof. In some embodiments, the displayed data may be editable. Specifically, a user may edit the displayed data via a user application installed on a terminal (e.g., the terminal 140). In some embodiment, the user may add new data or delete the displayed data displayed on the visualized data interface 420. For example, the user may add a graph which is related to a trend of housing sales. In some embodiment, the user may set the format (e.g., a graph template, add or delete an index, font, color, etc.) of the displayed data. For example, the user may change a column graph of a trend of second-hand housing sales into a line graph.

The report generation interface 430 may be configured to display a report. The report may be a weekly report, a monthly report, an annual report, a comment report, an event review report, or the like, or any combination thereof, of a company, a component in an industry chain of an industry field, or the whole industry field. In some embodiments, the report may include a plurality of graphs and/or text descriptions. In some embodiments, the report may be updated when the data based on which the report is generated has changed, e.g., in real time. In some embodiments, the report may be editable. Specifically, a user may edit the report via a user application installed on a terminal (e.g., the terminal 140). In some embodiment, the user may add new content or delete some content in the report. For example, the user may add a comment regarding investment, a target price of a stock, a forecast price of the stock, or the like, or any combination thereof. In some embodiment, the user may set the format (e.g., a graph template, font, color, etc.) of the report. For example, the user may change a column graph of a trend of second-hand housing sales into a line graph.

The public opinion monitoring interface 440 may be configured to display one or more public opinions. Exemplary public opinions may include news and/or a public remark of an industry, a company, the global economy, or the like, or any combination thereof.

Figure 5:
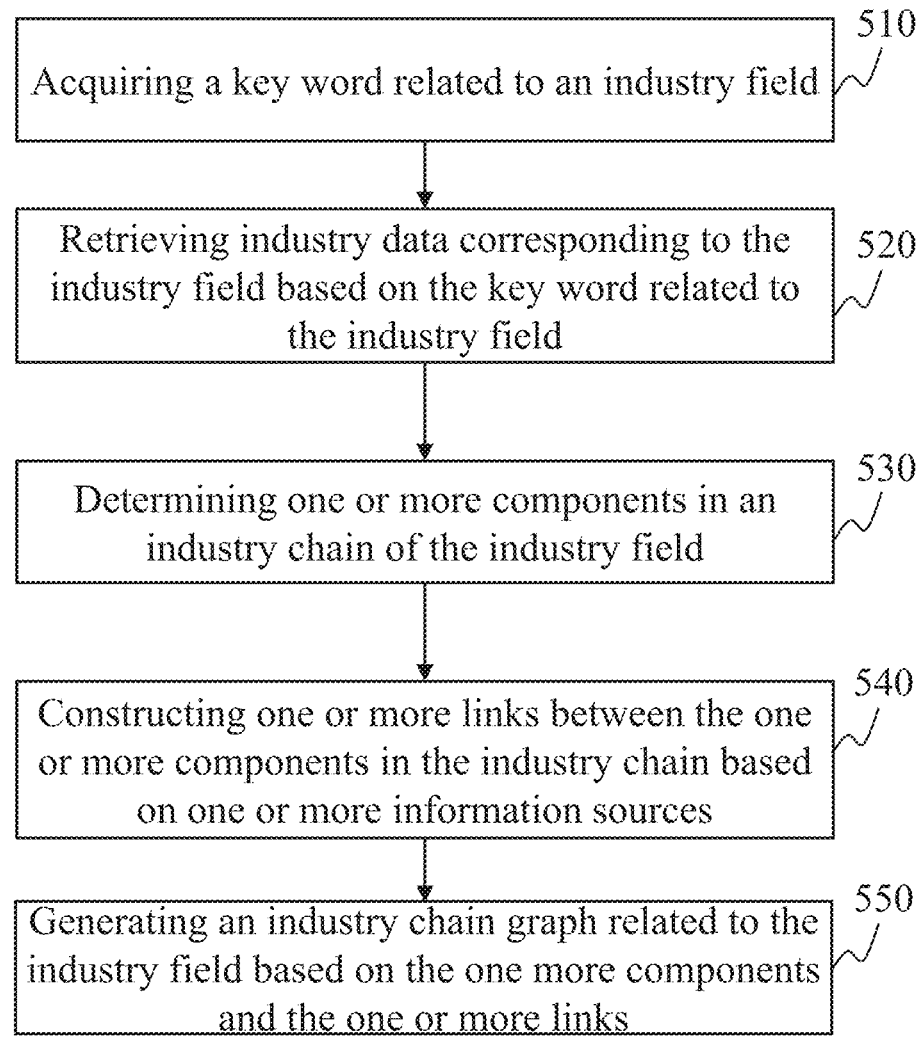
FIG. 5 is a flowchart illustrating an exemplary process for generating an industry chain graph according to some embodiments of the present disclosure.

FIG. 5 is a flowchart illustrating an exemplary process for generating an industry chain according to some embodiments of the present disclosure. In some embodiments, the process 500 may be implemented as a set of instructions (e.g., an application) stored in a storage device (e.g., the storage device 120, the ROM 206, and/or RAM 207). The processor 205 and/or one or more engines in FIG. 3 may execute the set of instructions, and when executing the instructions, the processor 205 and/or the one or more engines in FIG. 3 may be configured to perform the process 500. The operations of the illustrated process present below are intended to be illustrative. In some embodiments, the process 500 may be accomplished with one or more additional operations not described and/or without one or more of the operations herein discussed. Additionally, the order in which the operations of the process as illustrated in FIG. 5 and described below is not intended to be limiting.

The term "industry chain graph" in the present disclosure may refer to a graphic or a non-graphic structure indicating an industry chain of an industry. The industry chain of the industry field may indicate one or more activities related to the industry field. The industry chain may include one or more components that represent entities engaged in the industry field. For example, the one or more components in an industry chain of real estate may include a building material supply component, a building design component, a building construction component, a land supply component, a real estate financing component, a real estate operating component, a decoration component, or the like, or any combination thereof. The building design component may relate to the design of a building. The land supply component may relate to a land supply for building reconstruction. The real estate financing component may relate to financing activity of the real estate industry.

In some embodiments, a component in an industry chain may include one or more sub-components. Merely by way of example, a component or a sub-component may include one or more companies or organizations related to the component or the sub-component. For example, the building material supply component may relate to material supply for building reconstruction, such as supply of steel, supply of cement, supply of glass, supply of zinc, supply of aluminum, etc., and here, the building material supply component may include a sub-component of steel supply, a sub-component of cement supply, a sub-component of glass supply, a sub-component of zinc supply, a sub-component of aluminum supply, or the like, or any combination thereof.

In some embodiments, the industry chain graph of an industry may be represented by one or more visual indicators indicating a contextual relationship(s) between the one or more components in the industry. Additionally or alternatively, the industry chain graph may be represented by computer codes encoding the contextual relationship(s) between the one or more components in the industry. In some embodiments, an industry chain graph represented by one or more visual indicators may include one or more nodes and one or more segments. A segment may link two different nodes (i.e., two different components).

In 510, the server 130 (e.g., the data acquisition engine 320) may acquire a key word related to an industry field. The industry field may be any fields corresponding to real estate, food service, cosmetics, apparel, tourism, internet, office supplies industry, electronics, daily necessities, communications equipment, toys, jewelry, outside the automotive, home appliances, healthcare, new energy resources, movie and TV media, Hadoop, logistics, or the like, or any combination thereof. A user may input the key word related to the industry field via a user terminal. The user input may be in the format including but not limited to numbers, characters, symbols, text, sound, graphics, images, video, or the like, or a combination thereof. In some embodiments, the industry field may be acquired from the storage device 120 or the terminal 140 via the network 110. For example, the industry field may be set by a user using the terminal 140 and acquired by the server 130 via the network 110. As another example, the key word related to the industry field may be stored in the storage device 120 (or industry field storage module 311) and acquired by the server 130 via the network 110.

In 520, the server 130 (e.g., the data acquisition engine 320) may retrieve industry data corresponding to the industry field based on the key word related to the industry field. The server 130 may retrieve the industry data corresponding to the industry field based on the key word related to the industry field via the network 110. The server 130 may retrieve one or more information sources to obtain the industry data corresponding to the industry field. The one or more information sources may include a dictionary, news of the industry field or relevant companies in the industry field, a research report of the industry field or relevant companies in the industry field, an announcement of the industry field or the relevant companies in the industry field, a product manual of the industry field, a web page of relevant industry websites, or the like, or any combination thereof. In some embodiments, the industry data may include one or more economic indexes relating to the industry field. For example, the real estate industry data may include a nationwide average sales volume of housing, a nationwide housing inventory, or the like, or any combination thereof.

In some embodiments, the industry data may be pre-stored and acquired from the storage device 120 or the terminal 140 via the network 110. The server 130 may regularly or irregularly update the industry data. For example, the data may be stored in the storage device 120 (or the industry data storage module 312) and acquired by the server 130 via the network 110.

In 530, the server 130 (e.g., the data analysis engine 330) may determine one or more components in an industry chain of the industry field. The industry chain of the industry field may include one or more activities related to the industry field. For example, the one or more components in an industry chain of real estate may include a building material supply component, a building design component, a building construction component, a land supply component, a real estate financing component, a real estate operating component, a decoration component, or the like, or any combination thereof. Optionally, a component in the industry chain may include one or more sub-components. A component or a sub-component may include one or more companies or organizations related to the component or the sub-component. For example, the building material supply component may relate to material supply for building reconstruction, such as supply of steel, supply of cement, supply of glass, supply of zinc, supply of aluminum, etc., and the building material supply component may further include a sub-component of steel supply, a sub-component of cement supply, a sub-component of glass supply, a sub-component of zinc supply and a sub-component of aluminum supply. The building design component may relate to the design of a building. The land supply component may relate to a land supply for building reconstruction. The real estate financing component may relate to the financing activity of the real estate industry. The real estate operating component may relate to the real estate trade. The building material supply component or a sub-component of the building material supply component may include one or more companies related to the component or the sub-component.

In some embodiments, the server 130 may determine the one or more components based on the industry data or the one or more information sources of the industry field, then determine the one or more sub-components based on the one or more components and the industry data or the one or more information sources. For example, after acquiring a key word related to an industry field, the server 130 may determine one or more synonyms of the key word and determine a key word group related to the industry field based on the key word and the one or more synonyms of the key word. Then the server 130 may retrieve and analyze information related to the key word group of the industry field to determine the one or more components of the industry. For example, if the server 130 retrieves a sentence "material supply seriously impacts on the real estate recently" from a report of the one or more information source, the server 130 may determine the "material supply" as a component of the industry chain of the real estate. For another example, if the server 130 retrieves 5,000 articles related to the real estate based on the key word and the one or more synonyms of the key word, and more than 50% of these articles contain the word "material supply", the server 130 may determine the "material supply" as a component of the industry chain of the real estate. In some embodiments, the server 130 may assign different weights based on the publisher of the one or more information sources.

In 540, the server 130 (e.g., the data analysis engine 330) may construct one or more links between the one or more components in the industry chain based on the one or more information sources. A link between a component A and a component B may represent a certain relationship (e.g., a contextual relationship, a temporal relationship) between the component A and the component B. For example, if the server 130 retrieves a sentence "material supply seriously impacts on building reconstruction," the server 130 may determine a link between the material supply component and the real estate component determined in Operation 530.

In some embodiments, the link may further include a direction. A link from a component A to a component B may indicate that resource(s) related to the component A is supplied to the component B. The resource(s) may include materials, capital, energy, services, staff, knowledge, or other assets. The server 130 may semantically analyze the information from the one or more information sources to determine the direction of a link. In some embodiments, the server 130 may determine the direction of the link based on a certain verb in a sentence that relates to the two components. For example, in the sentence "material supply seriously impacts building reconstruction," the server 130 may determine the direction of the link connecting the material supply component and the real estate component based upon the verb "impacts." In some embodiments, there may be two links with different directions between two components.

In some embodiments, the one or more links between the one or more components may be pre-stored and acquired from the storage device 120 or the terminal 140 via the network 110. The server 130 may regularly or irregularly update the one or more links between the one or more components. For example, the data may be stored in the storage device 120 (or industry data storage module 312) and acquired by the server 130 via the network 110.

In 550, the server 130 (e.g., the data analysis engine 330) may generate an industry chain graph related to the industry field based on the one or more components and the one or more links. The industry chain graph may include one or more indicators representing the one or more components and one or more lines linking the components representing the one or more links. In some embodiments, an indicator related to a component may include one or more companies related to the component. For example, by clicking an indicator representing the building material supply component, a list of companies related to the building material supply may be displayed near the indicator representing the building material supply component. Optionally, the list may provide a hyperlink directed to a page including industry data related to a company related to the building material supply. Industry data of a company may include company information, annual revenue and/or profits, monthly revenue and/or profits, or the like, or any combination thereof.

In some embodiments, an indicator related to a component may provide industry data related to the component. For example, by clicking the indicator representing the land supply component, a graph or a form of industry data related to the land supply component may be displayed near the indicator representing the land supply component. Industry data of land supply component may include an annual or yearly land supply amount for building reconstruction, an annual or yearly land price, or the like, or any combination thereof. It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations may be omitted in the exemplary process 500.

Figure 6:
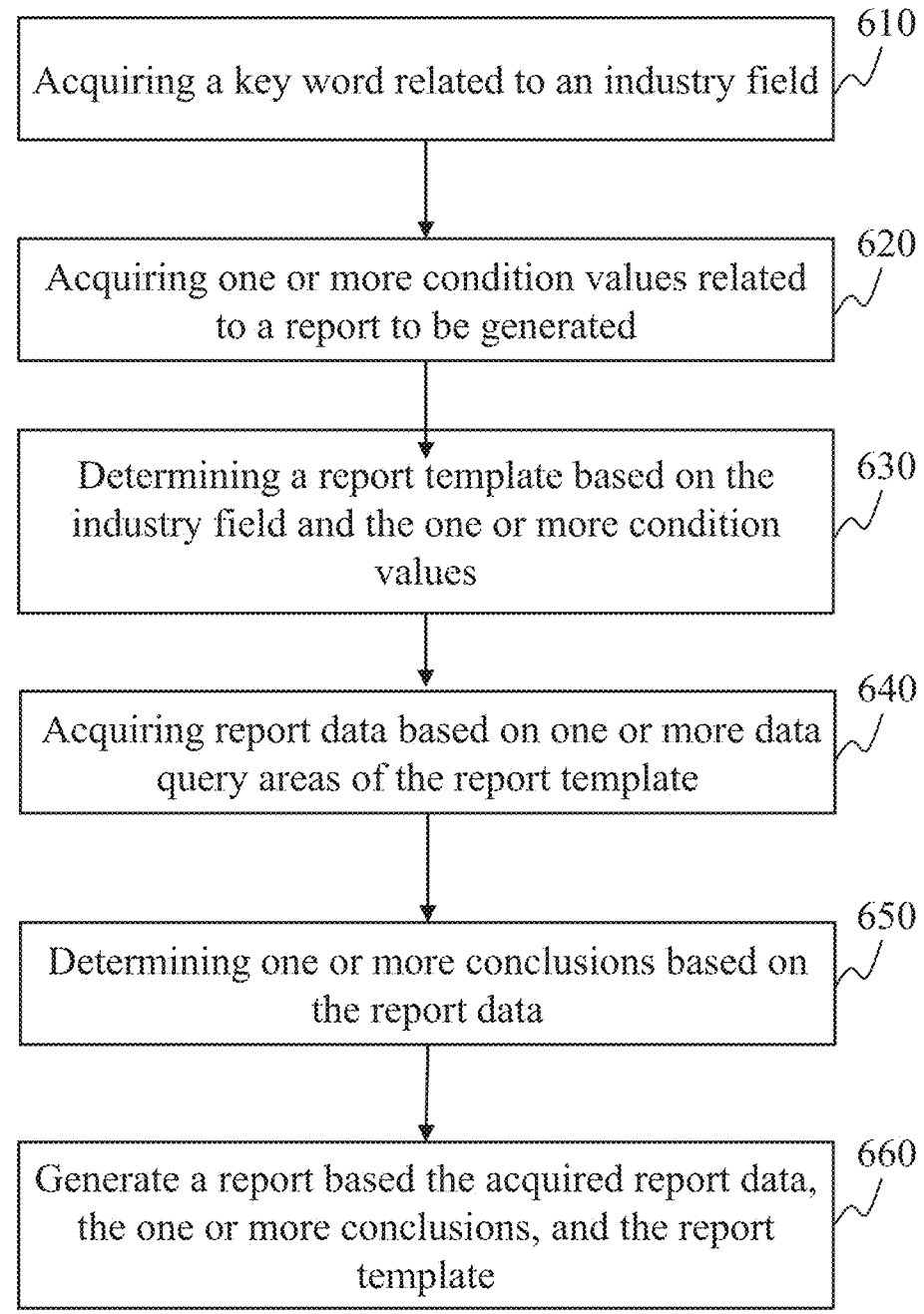
FIG. 6 is a flowchart illustrating an exemplary process for generating a report according to some embodiments of the present disclosure.

FIG. 6 is a flowchart illustrating an exemplary process for generating a report of an industry field according to some embodiments of the present disclosure. In some embodiments, the process 600 may be implemented as a set of instructions (e.g., an application) stored in the ROM 206, RAM 207, processor 205 and/or one or more engines in FIG. 3 may execute the set of instructions, and when executing the instructions, the processor 205 and/or the engines in FIG. 3 may be configured to perform the process 600. The operations of the illustrated process present below are intended to be illustrative. In some embodiments, the process 600 may be accomplished with one or more additional operations not described and/or without one or more of the operations herein discussed. Additionally, the order in which the operations of the process as illustrated in FIG. 6 and described below is not intended to be limiting.

In 610, the server 130 may determine an industry field. In some embodiments, the server 130 (e.g., the data acquisition engine 320) may acquire a key word related to an industry field. The industry field may be any fields corresponding to real estate, food service, cosmetics, apparel, tourism, internet, office supplies industry, electronics, daily necessities, communications equipment, toys, jewelry, outside the automotive, home appliances, healthcare, new energy resources, movie and TV media, Hadoop, logistics, or the like, or any combination thereof. In some embodiments, a user may input the key word related to the industry field via a user terminal. The user input may be in the format including but not limited to numbers, characters, symbols, text, sound, graphics, images, video, or the like, or a combination thereof. In some embodiments, the industry field may be acquired from the storage device 120 or the terminal 140 via the network 110. For example, the industry field may be set by a user using the terminal 140 and acquired by the server 130 via the network 110. As another example, the key word related to the industry field may be stored in the storage device 120 (or industry field storage module 311) and acquired by the server 130 via the network 110.

In some embodiments, the industry field may be inputted by a user via the terminal 140. The user may input the industry field via a typing input, a hand input, a voice input, a picture input, etc. In some embodiments, the industry field may be selected by a user via the terminal 140 from a plurality of industry fields. For example, a user application installed on the terminal 140 may show the plurality of industry fields including real estate, food service, cosmetics, apparel, tourism, internet, office supplies industry, electronics, daily necessities, communications equipment, etc. Then the user may select the real estate industry field from the plurality of industry fields via the terminal 140.

In 620, the server 130 (e.g., the data acquisition engine 320) may acquire one or more condition values related to a report to be generated. A condition value may be related to a type of report to be generated. In some embodiments, the condition value may be related to a general time range of the report to be generated. For example, the type of the report to be generated may include an annual report, a quarterly report, a monthly report, etc. In some embodiments, the condition value may be related to a specific time range of the report to be generated. For example, the time range may be related to a period from May 12, 2018, to Jun. 11, 2018. In some embodiments, the condition value may be related to the content of the report to be generated. For example, the type of the report to be generated may include a report with respect to a company, a report with respect to an event, a report with respect to a review of an industry field, or the like, or any combination thereof.

In some embodiments, the one or more condition values may be inputted by a user via the terminal 140. The user may input the condition value(s) via a typing input, a hand input, a voice input, a picture input, etc. In some embodiments, the condition value(s) may be selected by a user via the terminal 140 from a plurality of condition values. For example, a user application installed on the terminal 140 may show the plurality of condition values corresponding to different types of reports. Then the user may select a desired condition value from the plurality of condition values via the terminal 140.

In 630, the server 130 (e.g., the data analysis engine 330) may determine a report template based on the industry field and the one or more condition values. For example, the report template may include one or more data query sections, one or more analysis sections, and one or more conclusion sections, or the like, or any combination thereof. A report template may refer to a preset structured text describing one or more business concepts related to the industry field. For example, a retail industry field might be related to two business concepts: market and product. The market may include a plurality of sales regions, each sale region may include several states, each of which consists of a set of stores. The product may include a set of departments (home electronics, men's clothing, hardware), each department may include a plurality of product categories (shirts, shoes, slacks), and each category may include individual manufacturer's product lines. In some embodiments, a business concept in the report template may include one or more business indicators related to the business concept. For example, a business indicator may include product volume, price, or current stock.

In some embodiments, the report template may include one or more data query sections related to the one or more business indicators. A data query section may be a blank in the structured text including a data query command for loading corresponding data in the data query section. For example, the report template may include a structured text "The price for product A is [data query section]," wherein the "[data query section]" corresponds to the price for product A.

In some embodiments, the report template may include one or more conclusion sections. A conclusion section may be a blank in the structured text including a command for generating and/or loading a conclusion related to the one or more business indicators. In some embodiments, the conclusion may be related to a trend for a specific business indicator or indicators over a specified period of time. In some embodiments, the conclusion may include a comparison between values of two business indicators across the same time period and/or a comparison between values of a same business indicator across two time segments across the same time period.

In 640, the server 130 (e.g., the data acquisition engine 320) may acquire report data based on the one or more data query sections of the report template. The server 130 may acquire the report data based on the data query command corresponding to the data query sections. In some embodiments, the report data may be acquired from the storage device 120 and/or the terminal 140 via the network 110. For example, link data related to an industry field may be stored in the storage device 120 (or data storage engine 310) and acquired by the server 130 via the network 110. In some embodiments, the acquisition of the report data may be performed in a similar manner with the acquisition of data (e.g., the industry data) as described in connection with FIG. 5, and the descriptions thereof are not repeated here.

In 650, the server 130 may determine one or more conclusions based on the report data. In some embodiments, a conclusion may be related to a trend for a specific business indicator or indicators over a specified period of time. For example, a conclusion may be that "Price of product A increases by 5% in 2018." In some embodiments, a conclusion may include a comparison between values of two or more business indicators across the same time period and/or a comparison between values of a same business indicator across two time segments across the same time period. For example, the conclusion may be that "The price of product A is higher than the price of product B," or "The price of product A is highest among the prices of products A, B, and C."

In some embodiments, a conclusion may be an alert. An alert may be generated when one or more conditions (e.g., a user-defined condition or set of conditions) are satisfied. For instance, a condition may be defined so that when the inventory of brand A shirts drops below 200 units in a given week, the server 130 may produce a message alert. In some embodiments, a conclusion may include an analysis result regarding a change of the value(s) of one or more business indicators. For example, a conclusion may describe a value change of a business indicator over at least two time periods, which may indicate a difference of the business indicator in those time periods (e.g., a difference between the sales volume of textiles in this year and the sales volume of textiles in last year). Optionally, the conclusion may describe the value change of the business indicator over a day, week, month, quarter, year, or other defined period.

In some embodiments, a conclusion may be obtained using a trained model. In some embodiments, the trained model may be a convolutional neural network (CNN), a deep belief network (DBN), Stacked Auto-Encoders (SAE), a logistic regression (LR) model, a support vector machine (SVM), a decision tree model, a Naive Bayesian Model, a random forest model, a Restricted Boltzmann Machine (RBM), a Q-learning Model, or the like, or a combination thereof. In some embodiments, the CNN model may include at least one of a convolutional layer, a Rectified Linear Unit (ReLU) layer, a fully connected layer or a pooling layer, or the like, or any combination thereof. In some embodiments, a trained model may be generated by training a preliminary model based on historical data.

In 660, the server 130 (e.g., the data analysis engine 330) may generate a report based on the report data, the one or more conclusions, and the report template. The report may be a weekly report, a monthly report, an annual report, a comment report, an event review report, or the like, or any combination thereof, of a company, a link of an industry chain, or the whole industry. In some embodiments, the report may include one or more graphs and/or text description. In some embodiments, the report may be updated when the data has changed, e.g., in real time. In some embodiments, the report may be editable. For example, a user may edit the report via a user application installed on a terminal (e.g., the terminal 140). In some embodiment, the user may add new content or delete some content in the report. For example, the user may add a graph which is related to a trend of second-hand housing sales. As another example, the user may add a comment regarding investment, a target price of a stock, a forecast price of the stock, or the like, or any combination thereof. In some embodiment, the user may set the format (e.g., a graph template, font, color, etc.) of the report. For example, the user may change a column graph of a trend of second-hand housing sales into a line graph.

In some embodiments, the server 130 (e.g., the data analysis engine 330) may add or delete the content (or dimensionality) in the report automatically based on the data acquired from the data storage engine 310 or the network 110. In some embodiments, the server 130 (e.g., data analysis engine 330) may add or delete the content (or dimensionality) according to a big data analytics.

In some embodiments, the server 130 (e.g., the data analysis engine 330) may highlight a portion of the content in the report. The portion of the content may include information of interest to the user, a change in the report compared with another report (e.g., a previous annual report), the scope of business of a company, earnings rate of a company, or the like, or any combination thereof. In some embodiments, the highlighting of the change in the report may be implemented in a way of regular expression matching. In some embodiments, the highlighting of the information of interest to the user may be implemented by a model (e.g., a machine learning model). Merely by way of example, the model may be convolutional neural network (CNN), deep belief network (DBN), Stacked Auto-Encoders (SAE), logistic regression (LR) model, support vector machine (SVM), decision tree model, Naive Bayesian Model, random forest model, or Restricted Boltzmann Machine (RBM), Q-learning Model, or the like, or a combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
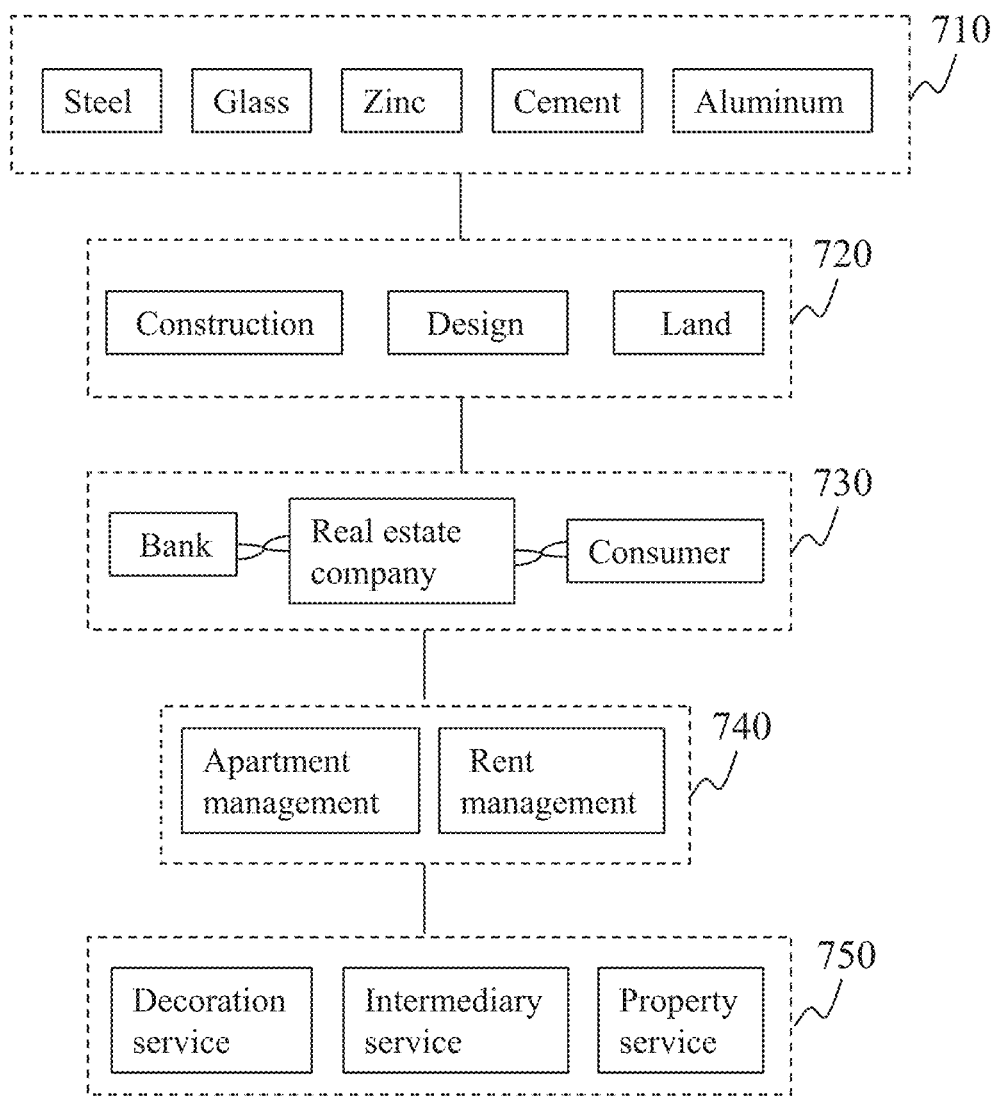
FIG. 7 is a schematic diagram illustrating exemplary components in a real estate industry according to some embodiments of the present disclosure.

FIG. 7 is a schematic diagram illustrating an exemplary industry chain graph 700 in a real estate industry according to some embodiments of the present disclosure. As shown in FIG. 7, the real estate industry may include one or more components 710-750. A building materials component 710 and a natural resources and planning programming component 720 may be in the upstream of the real estate industry. The building materials component 710 may include steel, glass, zinc, cement, aluminum, or the like, or any combination thereof. The natural resources and planning programming component 720 may include construction, design, land, or the like, or any combination thereof. A funds component 730 may include bank, real estate company, consumer, or the like, or any combination thereof. A real estate management component 740 may include apartment management, rent management, or the like, or any combination thereof. A services component 750 may be in the downstream of the real estate industry. The service component 750 may include decoration service, intermediary service, property service, or the like, or any combination thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object-oriented programming language such as Java, Scala, Smalltalk, Eiffel, JADE, Emerald, C++, C #, VB.NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for industry field analysis, comprising:
at least one non-transitory storage medium including a set of instructions; and
at least one processor in communication with the at least one non-transitory storage medium, wherein when executing the set of instructions, the at least one processor is configured to direct the system to:
acquire a key word related to an industry field;
determine a plurality of components in an industry chain of the industry field by retrieving and analyzing one or more sentences related to the key word related to the industry field;
construct one or more links between the plurality of components in the industry chain based on an industry data, wherein at least one link of the one or more links includes a direction, the direction is determined based on a certain verb in a sentence of the one or more sentences that relates to the plurality of components; and
generate an industry chain graph related to the industry field based on the plurality of components and the direction of the at least one link of the one or more links.

2. The system of claim 1, wherein to determine the plurality of components in the industry chain of the industry field by retrieving and analyzing the one or more sentences related to the key word related to the industry field, the at least one processor is configured to direct the system to:
determine a key word group related to the industry field based on the key word; and
determine the plurality of components by retrieving and analyzing the one or more sentences related to the key word group of the industry field.

3. The system of claim 2, wherein to determine the key word group related to the industry field based on the key word, the at least one processor is configured to direct the system to:
determine one or more synonyms of the key word; and
determine the key word group related to the industry field based on the key word and the one or more synonyms of the key word.

4. The system of claim 1, wherein to generate the industry chain graph related to the industry field based on the plurality of components and the one or more links, the at least one processor is configured to direct the system to:
retrieve the industry data corresponding to the industry field based on the key word related to the industry field from one or more information sources.

5. The system of claim 4, wherein the direction of the at least one link of the one or more links indicates a direction of a flow of resources.

6. The system of claim 4, wherein the at least one processor is further configured to direct the system to:
generate an indicator for providing industry data related to the one or more links.

7. The system of claim 4, wherein the at least one processor is further configured to direct the system to:
generate an indicator for providing industry data related to the plurality of components.

8. The system of claim 1, wherein at least one component of the plurality of components includes one or more sub-components.

9. The system of claim 1, wherein the at least one processor is configured to direct the system further to:
cause a visualized interface to display the industry chain graph.

10. The system of claim 1, wherein the at least one processor is configured to direct the system further to:
cause a visualized interface to display one or more indicators representing the plurality of components in the industry chain graph;
in response to receiving a click of an indicator representing one of the plurality of components from a user terminal, provide a hyperlink directed to a page including industry data related to the component represented by the clicked indicator.

11. The system of claim 1, wherein the at least one processor is configured to direct the system further to:
generate a report related to the industry field based on the industry chain graph.

12. A method for industry field analysis, comprising:
acquiring a key word related to an industry field;
determining a plurality of components in an industry chain of the industry field by retrieving and analyzing one or more sentences related to the key word related to the industry field;
constructing one or more links between the plurality of components in the industry chain based on an industry data,
wherein at least one link of the one or more links includes a direction,
the direction is determined based on a certain verb in a sentence of the one or more sentences that relates to the plurality of components; and
generating an industry chain graph related to the industry field based on the plurality of components and the direction of the at least one link of the one or more links.

13. The method of claim 12, wherein the determining the plurality of components in the industry chain of the industry field by retrieving and analyzing the one or more sentences related to the key word related to the industry field includes:
determining a key word group related to the industry field based on the key word; and determining the plurality of components by retrieving and analyzing the one or more sentences related to the key word group of the industry field.

14. The method of claim 13, wherein the determining the key word group related to the industry field based on the key word includes:
determining one or more synonyms of the key word; and
determining the key word group related to the industry field based on the key word and the one or more synonyms of the key word.

15. The method of claim 12, wherein the generating the industry chain graph related to the industry field based on the plurality of components and the one or more links includes:
retrieving the industry data corresponding to the industry field based on the key word related to the industry field from one or more information sources.

16. The method of claim 15, wherein the direction of the at least one link of the one or more links indicates a direction of a flow of resources.

17. The method of claim 15, further includes:
generating an indicator for providing industry data related to the one or more links or the plurality of components.

18. The method of claim 12, further includes:
causing a visualized interface to display one or more indicators representing the plurality of components in the industry chain graph;
in response to receiving a click of an indicator representing one of the plurality of components from a user terminal, providing a hyperlink directed to a page including industry data related to the component represented by the clicked indicator.

19. The method of claim 12, further includes:
generating a report related to the industry field based on the industry chain graph.

20. A non-transitory computer readable medium including a set of instructions for industry field analysis, wherein when executed by at least one processor, the set of instructions direct the at least one processor to effectuate a method, the method comprising:
acquiring a key word related to an industry field;
determining a plurality of components in an industry chain of the industry field by retrieving and analyzing one or more sentences related to the key word related to the industry field;
constructing one or more links between the plurality of components in the industry chain based on an industry data,
wherein at least one link of the one or more links includes a direction,
the direction is determined based on a certain verb in a sentence of the one or more sentences that relates to the plurality of components; and
generating an industry chain graph related to the industry field based on the plurality of components and the direction of the at least one link of the one or more links.

* * * * *